F. M. SLOUGH.
ELECTRIC SYSTEM.
APPLICATION FILED JULY 10, 1912.
1,192,006.
Patented July 25, 1916.
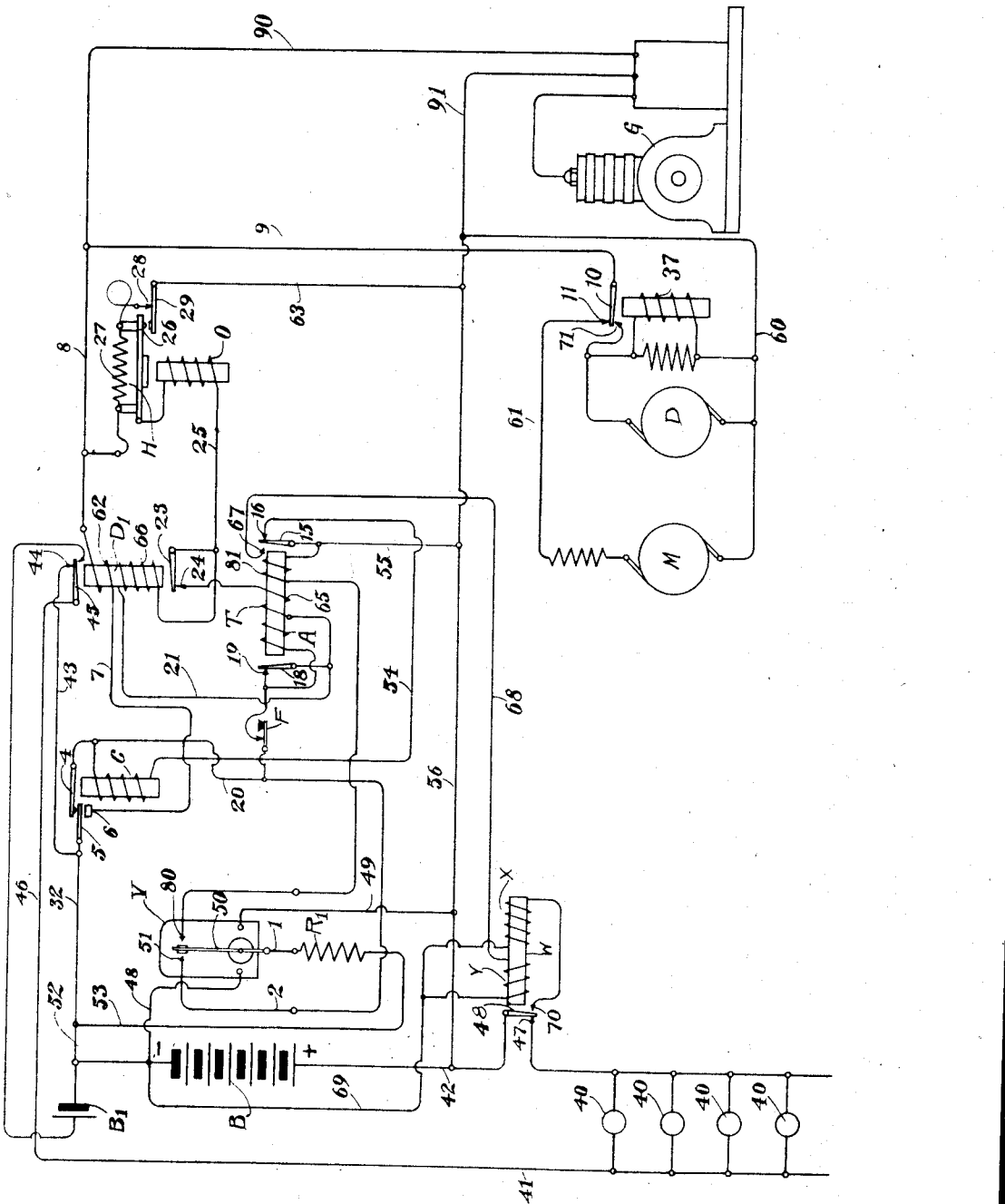
Witnesses
Inventor
Frank M. Slough
By J. O. Richey
His Attorney

UNITED STATES PATENT OFFICE.

FRANK M. SLOUGH, OF ELYRIA, OHIO, ASSIGNOR TO THE GARFORD MANUFACTURING COMPANY, OF ELYRIA, OHIO, A CORPORATION OF OHIO.

ELECTRIC SYSTEM.

1,192,006.  Specification of Letters Patent.  Patented July 25, 1916.

Application filed July 10, 1912. Serial No. 708,551.

*To all whom it may concern:*

Be it known that I, FRANK M. SLOUGH, a citizen of the United States, residing at Elyria, in the county of Lorain and State of Ohio, have invented certain new and useful Improvements in Electric Systems; and I do hereby declare the following to be a full, clear, and exact description of the invention, such as will enable others skilled in the art to which it appertains to make and use the same.

My invention relates to electric systems, and especially to systems adapted for use in isolated places or in places where the attendant is partially or totally unskilled in the art of managing such plants. For example, in lighting systems adapted to be used at country residences or upon farms or other isolated places where there is no attendant, or where those overseeing the operation of the plant are unskilled in the handling of such apparatus, I aim to make the operation of the plant automatic, so that the only attention required will be the supply of fuel to the prime mover and of such other attentions as are required to keep the apparatus in working order.

In the invention disclosed in this application I aim to improve upon that disclosed in my application #704,505, June 19, 1912.

The objects of my invention and the invention itself will be better understood from a description of the embodiment illustrated in the drawing.

The figure illustrates an embodiment of my invention.

Referring now to the drawing and to the particular embodiment of my invention there illustrated, at M and D, I show two dynamo electric machines, one of which, D, is employed to generate current to charge the accumulator B, and the other, M, is employed as a motor and is adapted to be driven by the current from the accumulator B to start a prime mover G, which is here shown as a gasolene engine. The accumulator B may consist of a storage battery which is used for the purpose of operating electro-responsive devices 40, which may consist of lamps which are connected to the battery B through the discharge circuit 41—42. A voltmeter or other suitable device V is connected across the battery B. The device V is constructed to respond to the condition of the charge of the battery B and to exercise control over the circuits in the manner to be described when the condition of the charge in the battery reaches a predetermined state.

C, T, and $D^1$ are relays whose function will be described in connection with the description of the apparatus.

H is a thermally operated device, whose function will be described, and O is an electro-magnet for locking the thermal device H in operative condition.

W is a device for giving a warning signal to the attendant when the system is inoperative.

The various parts, their functions and the system itself will be better understood from a description of the operation of the system which is as follows: When the battery B is sufficiently charged and the translating devices 40 operating, they will be connected in a circuit with the battery over the following conductor:—negative pole of battery —32—43— contact 44— armature 45 of the relay $D^1$— conductor 46—41—40—47—48— 42— to the positive pole of battery. When the charge in the battery has been consumed to a certain amount, such that the condition of the battery reaches a predetermined state, the effect of the charge upon the device V which is exercised over a circuit from the negative pole of battery-conductor 48— device V—49—42— back to positive pole of the battery, will be such that the needle 50 will close the switch 51, whereupon a circuit will be completed as follows:—negative pole of battery —52—53— resistance $R^1$—50— switch 51— conductor 20— relay C— conductor 54—16—15—55—56—42— positive pole of the battery. Relay C will be energized, attracting its armature 4, closing the switch 4—5 which short-circuits the resistance $R^1$ and switch 51, completing a circuit through the relay C as follows:—52— 32—5—4—C—54—16—15—55—56—42— positive pole of battery.

Since the instrument V may be delicate, it is desirable to relieve the needle of as much work as possible and by inserting the resistance $R^1$ in the circuit through the switch 51 and short-circuiting the same almost as soon as the circuit is completed, I reduce the work upon the needle 50 to a minimum. Upon further attracting the armature 4, the switch 5—6 is closed, completing a circuit as follows:—positive pole of battery —42—56—60—M—61—11—10—9—8— coil 62 of the relay D¹—7—6—5—52— to negative pole battery. The motor M is supplied with current over this circuit and begins to operate to start the prime mover G. The closing of the switch 5—6 also completes a circuit through the thermal device H as follows:—positive pole of battery —42—56—63—29—28—27—62—7— 6—5—32—52— to negative pole of battery. Current over this circuit begins to heat the coil 27, which will operate the switches 26—29 and 28—29 after a certain length of time determined by the time it takes the heating coil to heat the thermal mechanism to operating temperature. It is desirable to crank the engine longer in cold weather than in hot and it is obvious from the foregoing that it would take longer to heat the thermal mechanism to operating temperature in cold weather and that the device is self-regulating.

If the prime mover is for some reason inoperative, and the motor has failed to start the engine, within the period of time at the end of which the thermal device H is operated, this device will operate, closing a switch 26—29 and breaking the circuit of the thermal device 27 at 28—29. When the switch 26—29 was closed, a locking circuit for such switch was completed through the magnet O as follows:—positive pole of battery —42—56—63—29—26—0—25—23—24— winding 65 of the relay T—18—19— the switch F—20—4—5—32—52— back to battery B. A branch of this circuit will be completed through the winding 66 of the relay D¹ and the conductor 21. The relay O will be energized, locking the switch 26—29. The coils 62 and 66 of the relay D¹ will be energized adverse to each other, so that the armatures of this relay will remain in the position shown in the drawing. The relay T will attract the armatures 18 and 15, breaking the shunt of the winding A, so that current now passes through both the windings A and 65 of this relay. The armature 15 will be attracted, breaking the circuit of relay C and interrupting the connection between the motor M and the accumulator B, so that the motor ceases its efforts to start the inoperative engine, avoiding the useless expenditure of the energy stored in the accumulator and the strain and wear upon the system. The armature 15 will be held up, so that even though the switch 51 is closed, the relay C may not be reënergized in an effort to repeat the cycle just described. The armature 15 will engage a contact 67, completing a circuit through the winding Y as follows:—positive pole of battery through —42—56—55—15—67—68—Y—69— negative pole of battery B, energizing the winding Y and pulling up the armature 48, interrupting the circuit of the lamps 40 and completing a circuit for the winding X through a switch 48—70 as follows:—positive pole of battery —42—48—70—X—69— to negative pole of battery, energizing the winding X which will neutralize the effect of the winding Y, causing it to release the armature 48, which will close the switch 47—48 and the cycle will be repeated over and over again, flashing the lights 40 and notifying the farmer that the engine will not start.

When the engine is placed in condition for operation, the switch F will be operated, interrupting the circuits of the magnets T and O, so that the armature 15 drops back, closing the switch 15—16 and interrupting the switch 26—29, so that the system will now be operated as described to cause the energization of the motor M for the starting of the engine G. When the engine starts before the thermal device H is operated, the current through the circuit 8—56, which connects the battery and the motor, will be reversed in direction, since the dynamo D has now been connected and is charging the accumulator. This connection occurred as follows:—When the engine began to operate the dynamo, current flowed through the relay 37 and in a little while was sufficient to operate this relay, closing the switch 10—71 and connecting the dynamo to the battery. Current now flowing in a different direction from the coil 62 of the relay D¹ operates accumulatively with that through the winding 66 and attracting the armatures 45 and 23. The attraction of the armature 45 connects a battery B¹ in circuit with the dynamo D and in opposition to the battery B for the purpose of preventing undue rise of potential between the leads of the discharge circuit 41—42 on account of the charging of the battery B. This is accomplished in a way well understood in the art. The attraction of the armature 23 breaks the branch of the circuit through the winding 65 of the relay T, the winding A being at the same time shunted through the armature 18 and contact 19. Immediately after the charging begins, the switch 51 will be opened and when the charge of the battery has reached a condition desired, such as the full charging of the battery, the needle 50 will engage the contact 80, completing a circuit through the winding 81 of the relay T as follows:—positive pole battery —42—56—55—81—80—R1—53—52 to negative pole of battery. The relay T will pull up the armature 15, interrupting the circuit of the relay C, which in turn interrupts the circuits of the relays D¹, H and O, so that the system is returned to normal.

At 90 and 91 I show the ignition circuit for the engine, which is here illustrated as a gasolene engine, though any suitable form of prime mover may be employed.

While I have illustrated this particular embodiment of my invention, it will be understood that I do not wish to be limited to the form and details thereof, as numerous and extensive departures may be made without departing from the spirit of this invention.

I claim:—

1. In an electric system, an accumulator, a pair of dynamo electric machines, one of which is employed for charging said accumulator, a prime mover for actuating said charging dynamo electric machine, said prime mover adapted to be started by the other dynamo electric machine, means for automatically connecting one of said dynamo electric machines and said accumulator when the voltage of the accumulator reaches a predetermined value and means for automatically disconnecting said accumulator and said starting dynamo electric machine when said prime mover is in operative condition.

2. In an electric system, an accumulator, a dynamo electric machine for supplying energy to said accumulator, a prime mover for actuating said dynamo electric machine, a second dynamo electric machine for starting said prime mover, means acting automatically for connecting said second dynamo electric machine to said accumulator when the condition of said accumulator reaches a predetermined state, means for disconnecting said accumulator and said second dynamo electric machine when said prime mover is inoperative and a slow acting relay controlling said last named means.

3. In an electric system, the combination of an accumulator, a dynamo electric machine for charging said accumulator, a prime mover for operating said dynamo electric machine, a motor for starting said prime mover, means for automatically connecting said motor to said accumulator for starting said prime mover when the condition of the accumulator reaches a predetermined state and means for automatically connecting said dynamo electric machine in circuit with said accumulator when said prime mover has started the operation of said dynamo electric machine.

4. In an electric system, the combination of an accumulator, a dynamo electric machine for charging said accumulator, a prime mover for operating said dynamo electric machine, a motor for starting said prime mover, means for automatically connecting said motor to said accumulator to start said prime mover when the condition of said accumulator reaches a predetermined state, and electro-magnetic means controlled by said dynamo electric machine for connecting the same in circuit with said accumulator when said prime mover starts to operate said dynamo electric machine.

5. In an electric system, the combination of an accumulator, a dynamo electric machine for charging said accumulator, a prime mover for operating said dynamo electric machine, a motor for starting said prime mover, means for automatically connecting said motor to said prime mover to start the same, means for automatically disconnecting said motor from said accumulator should said prime mover be inoperative, a circuit for connecting said accumulator to said dynamo electric machine, and means controlled by said dynamo electric machine for automatically closing said circuit when said prime mover begins to operate said dynamo electric machine.

6. In an electric system, the combination of an accumulator, a dynamo electric machine for charging said accumulator, a prime mover for actuating said machine, a motor for starting said prime mover, means for connecting said motor to said accumulator and means for automatically disconnecting it therefrom should said prime mover fail to start within a predetermined period of time.

7. In an electric system, the combination of an accumulator, a dynamo electric machine for charging said accumulator, a prime mover for driving said machine, a motor for starting said prime mover, means for connecting said motor to said accumulator when the condition of the charge in the accumulator reaches a predetermined value, means for automatically causing the disconnection of said motor from said accumulator, locking means for said disconnecting means and a switch for releasing said locking means.

8. In an electric system, the combination of an accumulator for the storage of electric energy, a prime mover, dynamo electric machinery for charging said accumulator and starting said prime mover, thermally controlled means for automatically disconnecting said accumulator from the starting machinery when said machinery is inoperative to start said prime mover and holding means for said thermally controlled means.

9. In an electric system, the combination of an accumulator for the storage of electric energy, a prime mover, dynamo electric machinery for charging said accumulator and starting said prime mover, thermally controlled means for automatically disconnecting said accumulator from the starting machinery when said machinery is inoperative to start said prime mover and electro-magnetic means for said thermally controlled means.

10. In an electric system, the combination of an accumulator for the storage of electric energy, a prime mover, dynamo electric machinery for charging said accumulator and starting said prime mover, thermally controlled means for automatically disconnecting said accumulator from the starting machinery when said machinery is inoperative to start said prime mover, holding means for said thermally controlled means and means for releasing said holding means.

11. In an electric system, the combination of an accumulator, charging means for charging said accumulator, current conductors for connecting said charging means and said accumulator, electromagnetic means controlling said conductors, a circuit for said means including a resistance device and a switch, a device responsive to the condition of the charge in said accumulator controlling said switch, and a locking circuit for said electromagnetic means independent of said switch and said resistance device.

12. In combination, an internal combustion engine, a cranking motor therefor, a circuit for said cranking motor, means for automatically interrupting the circuit of said cranking motor if said motor fails to start said engine in a predetermined interval of time, and means responsive to the temperature of its surrounding medium for determining the length of said interval of time.

13. In combination, an internal combustion engine, a motor for starting the same, an accumulator, a circuit for said motor, means for closing said circuit, an electromagnetic device for automatically interrupting said circuit if said motor fails to start said engine in a predetermined interval of time and thermally controlled means for determining the length of such interval of time.

14. In combination, an internal combustion engine, means for cranking said engine including a source of energy, means for automatically preventing further cranking of said engine if said engine fails to start within a predetermined interval of time and means to subsequently prevent the cranking operation if the charge of energy in said source is below a predetermined amount.

15. In an electric system, the combination of an internal combustion engine, a starting motor for cranking the same, a source of energy for operating said starting motor, an alarm device, means for automatically disconnecting the source of energy from the starting motor and starting said alarm device if said starting motor fails to start said engine within a predetermined interval of time, and means for subsequently preventing farther cranking of said engine when the charge in said source is below a predetermined valve.

In testimony whereof, I have signed my signature in the presence of two witnesses.

FRANK M. SLOUGH.

Witnesses:
 EDGAR A. SPURR,
 F. O. RIDNY.